US008060602B2

(12) United States Patent
Singh et al.

(10) Patent No.: US 8,060,602 B2
(45) Date of Patent: Nov. 15, 2011

(54) NETWORK USAGE COLLECTION SYSTEM

(75) Inventors: Digvijay Singh, Tampa, FL (US);
Roman Krzanowski, White Plains, NY (US); Gregory Dale Best, Fairfax, VA (US); Mustansir M. Jhaveri, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

(21) Appl. No.: 11/860,177

(22) Filed: Sep. 24, 2007

(65) Prior Publication Data
US 2009/0083303 A1 Mar. 26, 2009

(51) Int. Cl.
*G06F 15/00* (2006.01)
*G06F 17/30* (2006.01)
(52) U.S. Cl. ........................ 709/224; 709/223
(58) Field of Classification Search .............. 709/223, 709/224
See application file for complete search history.

(56) References Cited

U.S. PATENT DOCUMENTS

| 7,743,139 | B1* | 6/2010 | Golan et al. ............... 709/224 |
| 2003/0105855 | A1* | 6/2003 | Wynnyk ................. 709/224 |
| 2003/0133450 | A1* | 7/2003 | Baum ..................... 370/389 |
| 2004/0039809 | A1* | 2/2004 | Ranous et al. ............. 709/223 |
| 2005/0138163 | A1* | 6/2005 | Schweitzer et al. .......... 709/223 |

* cited by examiner

Primary Examiner — Karen Tang
Assistant Examiner — Cheikh Ndiaye

(57) ABSTRACT

A system includes a first database to associate a sub-interface identifier with customer information, a second database to store a history of customer usage records, and a first device. The first device may receive information from a routing device, where the information includes the sub-interface identifier for a sub-interface of the routing device and information identifying an amount of network traffic received at or transmitted from the sub-interface over a time period, use the sub-interface identifier to obtain the associated customer information from the first database, associate the customer information with the information identifying an amount of network traffic received at or transmitted from the sub-interface over a time period to create a new customer usage record, and store the new customer usage record in the second database.

25 Claims, 18 Drawing Sheets

REPORT GENERATOR

CRITERIA (SELECT ONE OR MORE)

- [x] ENTER DATE RANGE  08-01-07  TO  08-31-07
- [x] ENTER TIME PERIOD  08:00 AM  TO  06:00 PM
- [x] ENTER LOCATION  10001-10048, 10055, 10100-10285
- [x] ENTER CUSTOMER IDS  ALL
- [x] ENTER CUSTOMER TYPE  ALL
- [x] SELECT OUTPUT TYPE  BAR CHART ▽
    - LINE CHART
    - PIE CHART

SUBMIT    CANCEL

ADMINISTRATOR 1510

NETWORK USAGE COLLECTION SYSTEM

BACKGROUND INFORMATION

Networks, such as the Internet, have become an increasingly important part of our everyday lives. Millions of people now access the Internet on a daily basis to, for example, shop for goods and services, obtain information of interest (e.g., movie listings, news, etc.), access desired files (e.g., word processing documents, movie files, music files, etc.), and communicate with friends, family, and co-workers (e.g., via e-mail or instant messaging). As a result, a vast amount of traffic traverses a network, such as the Internet, on a daily basis.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
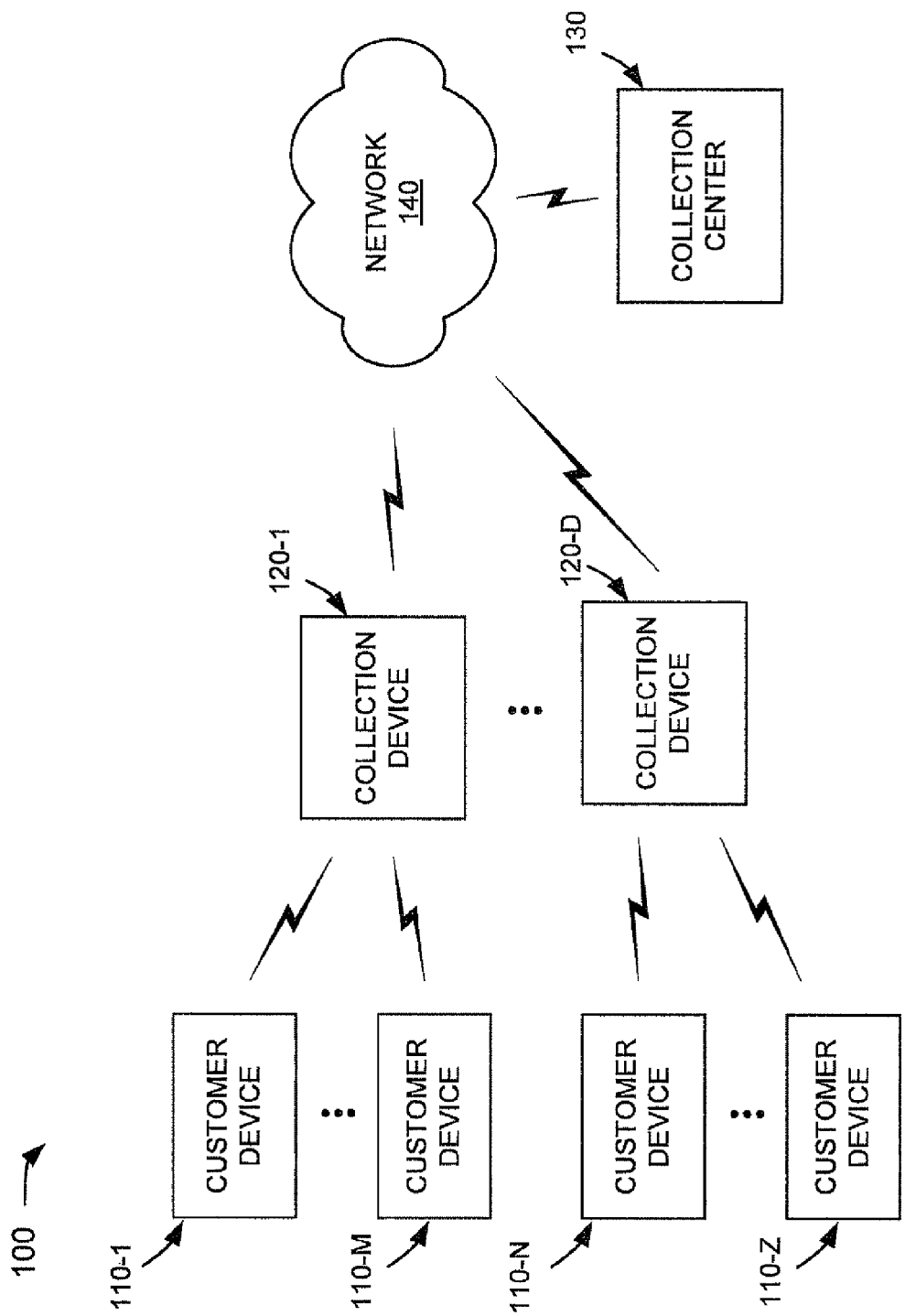
FIG. 1 is an exemplary network in which systems and methods, consistent with exemplary embodiments, may be implemented.

FIG. 1 is an exemplary network in which systems and methods, consistent with exemplary embodiments, may be implemented. As illustrated, network 100 may include a group of customer devices 110-1 through 110-Z, where M, N, and Z are integers greater than 1 (referred to collectively as "customer devices 110"), a group of collection devices 120-1 through 120-D (referred to collectively as "collection devices 120"), a collection center 130, and a network 140. The number of customer devices 110, collection devices 120, collection centers 130, and networks 140 illustrated in FIG. 1 is provided for simplicity. In practice, there may be more or fewer customer devices 110, collection devices 120, collection centers 130, and/or networks 140.

Customer devices 110 may include client entities. An entity may be defined as a device, such as a computer or another type of computation or communication device, a thread or process running on one of these devices, and/or an object executable by one of these devices. In one embodiment, customer devices 110 may include a personal computer, a laptop, a wireless device, a digital video recorder that obtains television programming from a network, and/or any other type of device that may receive and/or transmit data via a network, such as the Internet. In addition, customer devices 110 may include other types of devices, such as routers or switches. For example, customer devices 110 may include a wireless router, an Ethernet hub, and/or other types of devices.

Customer devices 110 may be associated with different customers. A customer, as defined herein, may broadly be construed as a residential customer or a business customer. In one embodiment, customer devices 110 associated with different customers may connect to the same collection device 120. For example, customer device 110-1 and customer device 110-M may be associated with different customers and both of these customer devices 110-1 and 110-M may connect to collection device 120-1. Customer devices 110 may connect to collection devices 120 via wired and/or wireless connections.

Collection devices 120 may include devices capable of collecting information relating to the traffic that is received from and/or transmitted to customer devices 110. In one embodiment, collection devices 120 may include devices capable of receiving traffic and transmitting the traffic toward its appropriate destination. In one implementation, collection devices 120 may include a router, a switch, a firewall, etc. Alternatively or additionally, collection devices 120 may include devices capable of snooping traffic transmitted to or received from customer devices 110. Collection devices 120 may transmit the collected information to collection center 130. Collection devices 120 may connect to network 140 via wired and/or wireless connections.

Collection center 130 may include a group of devices that receives and stores the traffic-related information collected by collection devices 120 and correlates the traffic-related information with the customer(s) with which the traffic-related information relates. Collection center 130 may further allow for network usage to be billed to the appropriate customer. Collection center 130 may allow customers and/or network administrators to generate reports using the stored information. Collection device 130 may connect to network 140 via wired and/or wireless connections.

Network 140 may include one or more networks of any type, including a Public Land Mobile Network (PLMN), a Public Switched Telephone Network (PSTN), a local area network (LAN), a metropolitan area network (MAN), a wide area network (WAN), an Internet Protocol Multimedia Subsystem (IMS) network, a private network, the Internet, an intranet, and/or another type of network.

In one embodiment, one or more components of network 100 may perform one or more of the tasks described below as performed by one or more other components of network 100.

Figure 2:
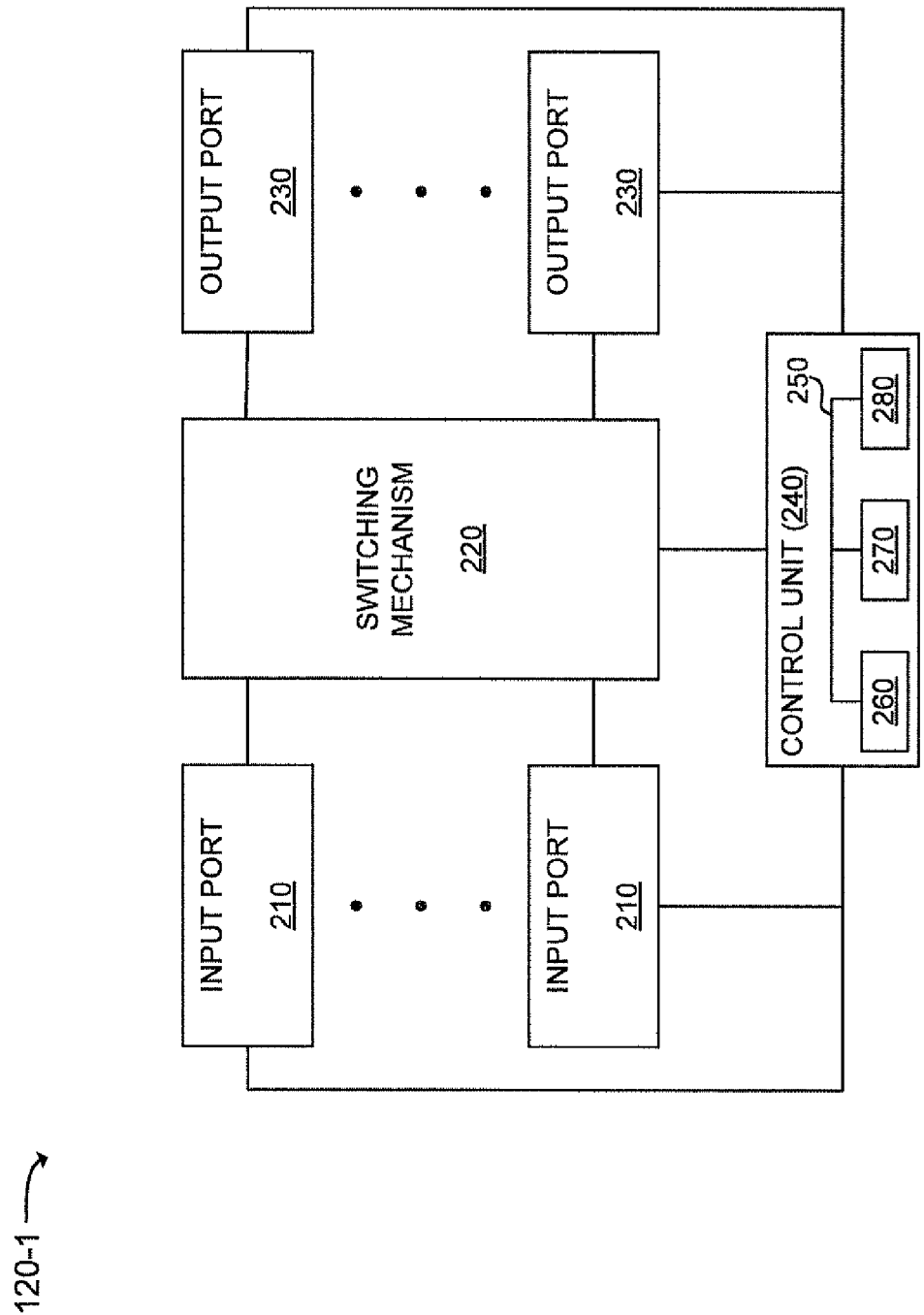
FIG. 2 is an exemplary block diagram of the collection device of FIG. 1.

FIG. 2 is an exemplary block diagram of collection device 120-1 according to an exemplary embodiment. Collection device 120-D may be similarly configured. As illustrated, collection device 120-1 may include input ports 210, a switching mechanism 220, output ports 230, and/or a control unit 240. Input ports 210 may be the points of attachments for physical links and may be the points of entry for incoming traffic. Switching mechanism 220 may interconnect input ports 210 with output ports 230. Output ports 230 may store the traffic and may schedule the traffic on one or more output physical links. Control unit 240 may use routing protocols and may create a forwarding table that is used in traffic forwarding.

Each input port 210 may be associated with a group of sub-interfaces. In one embodiment, each sub-interface may be associated with a single customer. Input ports 210 may look up a destination address of incoming traffic (e.g., any type or form of data, such as packet or non-packet data) in a forwarding table to determine its destination port (i.e., route lookup). Input ports 210 may run datalink-level protocols and/or network-level protocols.

Switching mechanism 220 may provide a link between input ports 210 and output ports 230. For example, switching mechanism 220 may include a group of switching devices that route traffic from input ports 210 to output ports 230.

Output ports 230 may store traffic before it is transmitted on an output link. Output ports 230 may include scheduling algorithms that support priorities and guarantees. Output ports 230 may support data encapsulation and decapsulation, and/or a variety of higher-level protocols. Each output port 230 may be associated with a group of sub-interfaces. In one exemplary embodiment, each sub-interface may be associated with a single customer.

Control unit 240 may interconnect with input ports 210, switching mechanism 220, and output ports 230. Control unit 240 may compute a forwarding table, use routing protocols, and/or run software to configure and manage collection device 120-1. Control unit 240 may handle any traffic whose destination address may not be found in the forwarding table.

In one implementation, control unit 240 may include a bus 250 that may include a path that permits communication among a processor 260, a memory 270, and a communication interface 280. Processor 260 may include a microprocessor or processing logic (e.g., an application specific integrated circuit (ASIC), field programmable gate array (FPGA), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Memory 270 may also store information relating to traffic received at input ports 210 and/or transmitted from output port 230. In one embodiment, memory 270 may associate the information with a sub-interface on which the traffic is received and/or transmitted. Communication interface 280 may include any transceiver-like mechanism that enables control unit 240 to communicate with other devices and/or systems.

Collection device 120-1 may perform certain operations, as described in detail below. Collection device 120-1 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of collection device 120-1, in other implementations, collection device 120-1 may contain fewer, different, or additional components than depicted in FIG. 2. In still other implementations, one or more components of collection device 120-1 may perform one or more of the tasks described below as performed by one or more other components of collection device 120-1.

Figure 3:
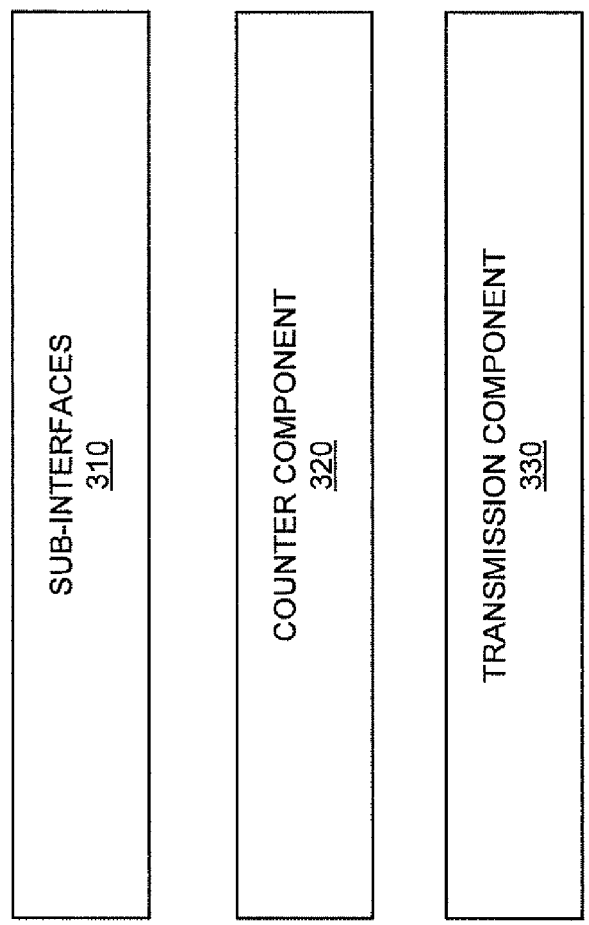
FIG. 3 is an exemplary functional diagram of a portion of the collection device of FIG. 1.

FIG. 3 is an exemplary functional diagram of a portion of collection device 120-1 according to an exemplary embodiment. Collection device 120-D may be similarly configured. As illustrated, collection device 120-1 may include a group of sub-interfaces 310, a counter component 320, and a transmission component 330.

Sub-interfaces 310 may include a group of interfaces associated with input ports 210 and output ports 220 of collection device 120-1. In one embodiment, each sub-interface 310 may be associated with a single customer. In some exemplary embodiments, a single sub-interface 310 may be associated with an input port 210 and an output port 230 of collection device 120-1.

Counter component 320 may include one or more counters that track the amount of traffic received from and/or transmitted to customer devices 110-1 through 110-M. In one exemplary embodiment, counter component 320 may include a counter for each sub-interface 310 with which collection device 120-1 is associated. Each counter may track, for example, the number of bytes that is received from the customer device or customer devices at the particular sub-interface and/or the number of bytes that is transmitted to the customer device or customer devices at the sub-interface.

Transmission component 330 may include one or more components that may obtain counter values from counter component 320 and transmit usage messages, which include the counter values, to collection center 130. In one exemplary embodiment, transmission component 330 may obtain the counter values from the counters at a configurable interval (e.g., once every 30 minutes, hour, day, etc.). Once the counter values are obtained, transmission component 330 may reset the counters in counter component 320. Transmission component 330 may format the usage messages transmitted to collection center 130 so as to transmit only that information needed by collection center 130. For example, in one embodiment, transmission component 330 may transmit one or more usage messages that include information identifying collection device 120-1, information identifying each sub-interface 310 with which collection device 120-1 is associated, and the counter value associated with each of sub-interfaces 310. Transmission component 330 may transmit the one or more usage messages at a configurable time interval or in response to a command received, for example, from collection center 130.

Although FIG. 3 shows exemplary functional components of collection device 120-1, in other implementations, collection device 120-1 may contain fewer, different, or additional functional components than depicted in FIG. 3. In still other implementations, one functional component of collection device 120-1 may perform one or more of the tasks described below as performed by another functional component of collection device 120-1.

Figure 4:
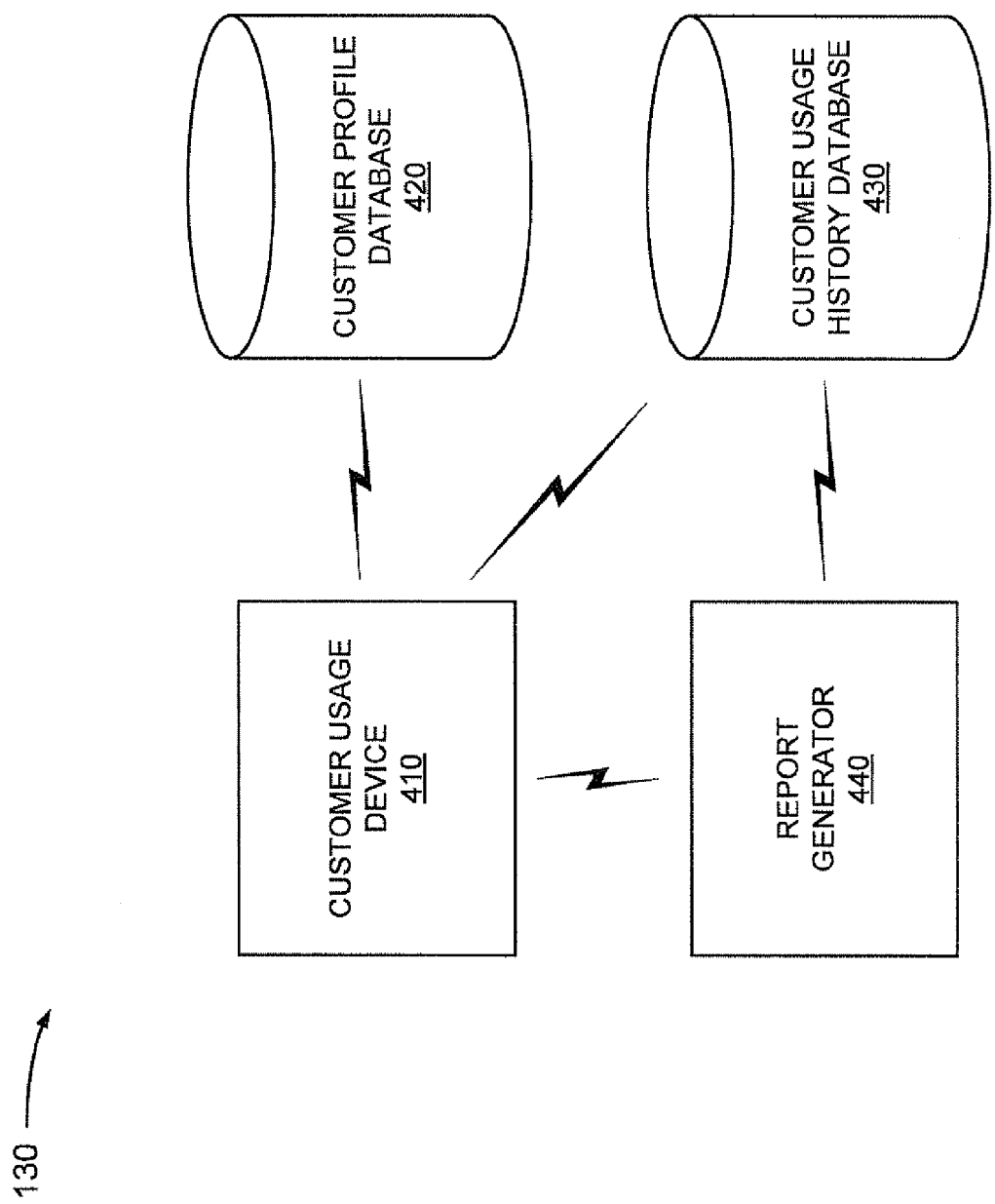
FIG. 4 is an exemplary block diagram of the collection center of FIG. 1.

FIG. 4 is an exemplary block diagram of collection center 130 according to an exemplary embodiment. As illustrated, collection center 130 may include a customer usage device 410, a customer profile database 420, a customer usage history database 430, and a report generator 440.

Customer usage device 410 may include one or more components that receive usage messages from collection devices 120 and store information from the received usage messages. Customer usage device 410 may also associate the received information with customer information to create customer usage records. Customer usage device 410 may forward the customer usage records to customer usage history database 430. Further information relating to customer usage device 410 is described below in relation to FIGS. 5-7.

Customer profile database 420 may include one or more components that store information for groups of customers. The information may include, for example, customer identification information, address information (e.g., street, city, and/or zip code), and/or other information. Further information relating to customer profile database 420 is described below in relation to FIG. 8.

Customer usage history database 430 may include one or more components that store customer usage records for a period of time. For example, customer usage history database 430 may store customer usage records for a particular customer for one year (or another period of time). Further information relating to customer usage history database 430 is described below in relation to FIG. 9.

Report generator 440 may receive report requests from customers and/or network administrators, obtain the appropriate information from customer usage device 410 and/or customer usage history database 430, generate reports using the obtained information, and provide the generated reports. For example, report generator 440 may generate a report for a particular customer that provides the customer with information regarding the customer's network usage over a desired time period. As another example, report generator 440 may generate a report for a network administrator that provides customer network usage over a time period for all customers in a particular geographic area. Further information relating to report generator 440 is described below in relation to FIG. 10.

Although FIG. 4 shows exemplary components of collection center 130, in other implementations, collection center 130 may contain fewer, different, or additional components than depicted in FIG. 4. In still other implementations, one or more components of collection center 130 may perform one or more of the tasks described below as performed by one or more other components of collection center 130.

Figure 5:
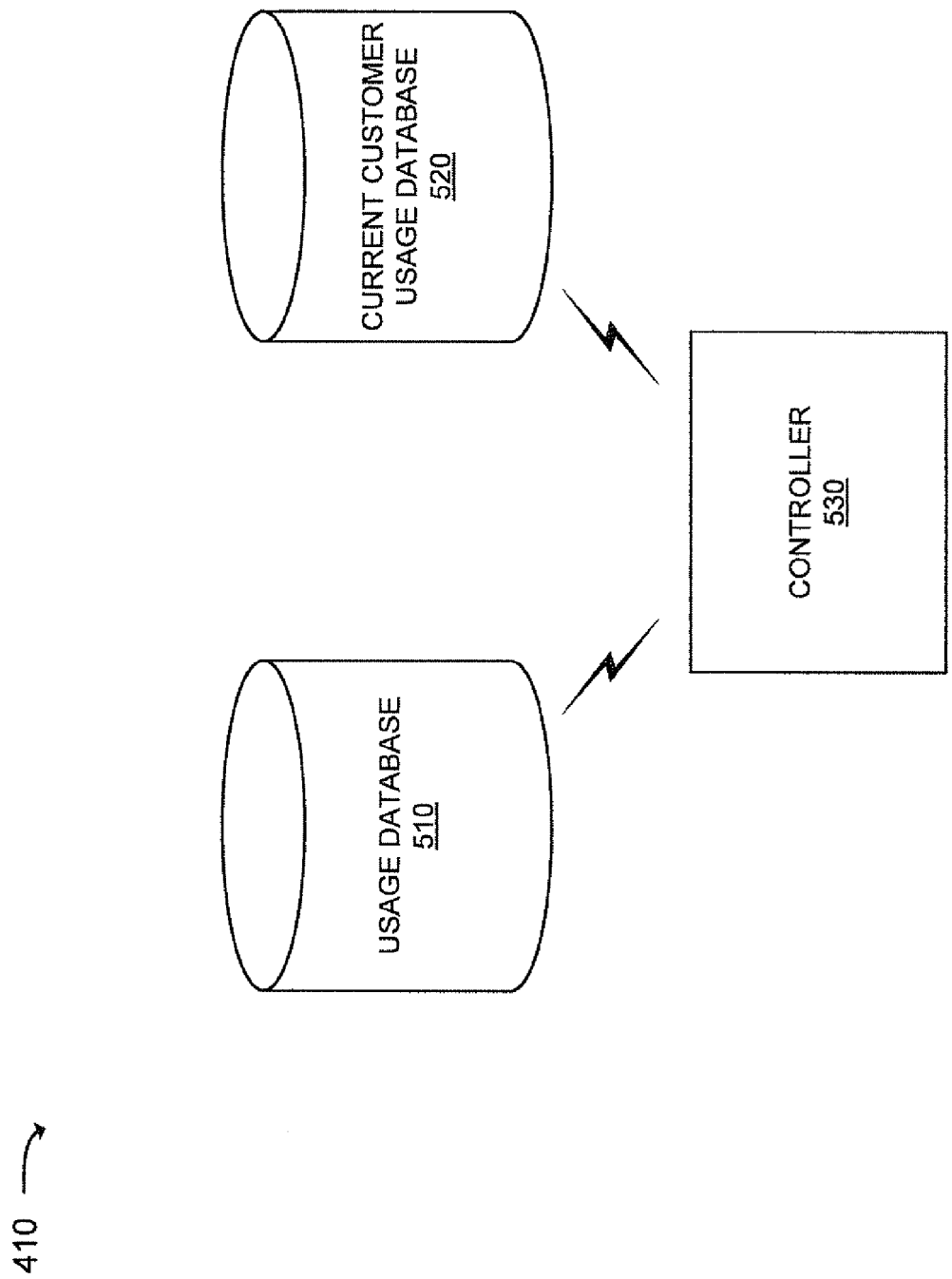
FIG. 5 is an exemplary block diagram of the customer usage device of FIG. 4.

FIG. 5 is an exemplary block diagram of customer usage device 410 according to an exemplary embodiment. As illustrated, customer usage device 410 may include a usage database 510, a current customer usage database 520, and a controller 530.

Figure 6:
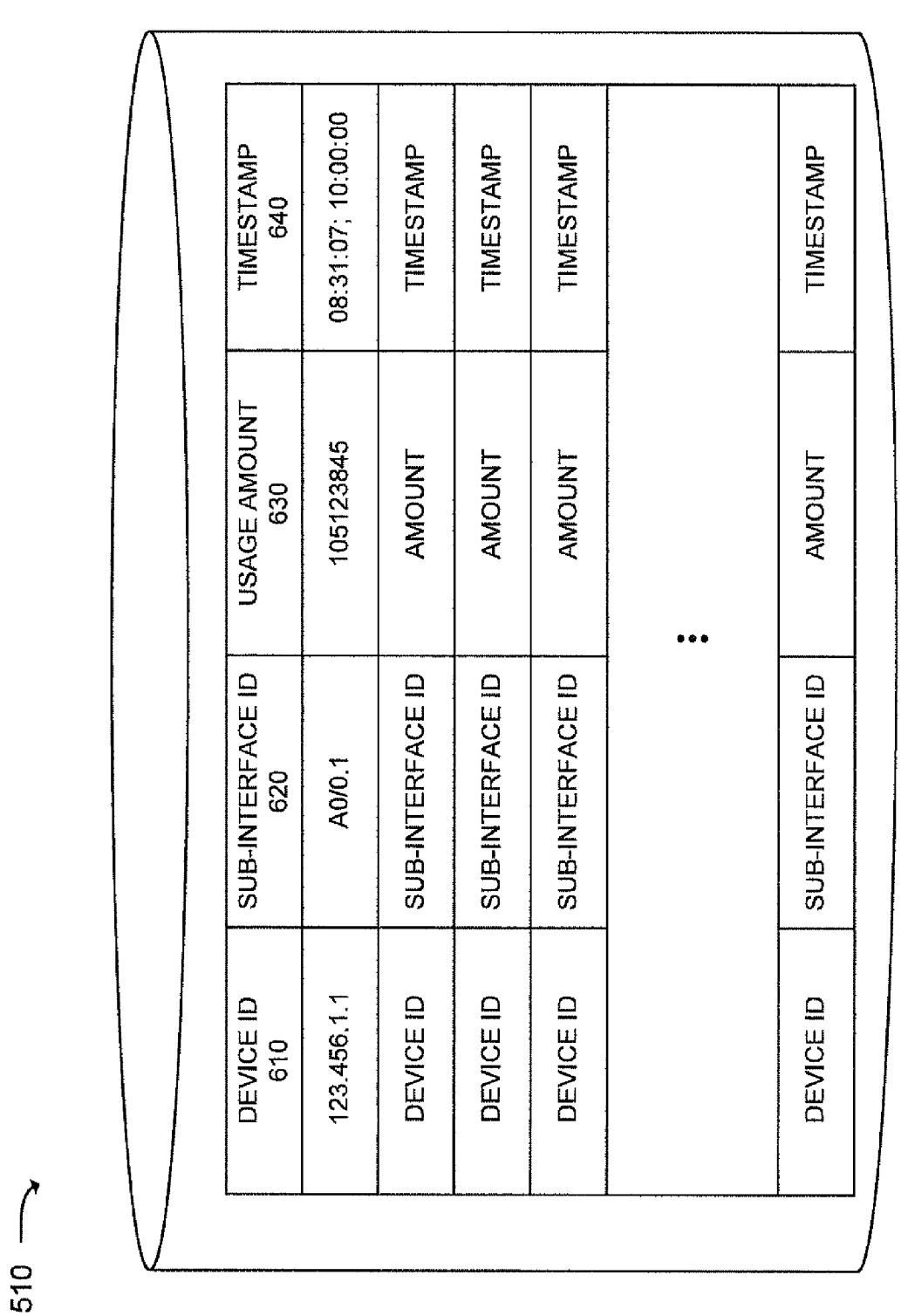
FIG. 6 is an exemplary diagram of the usage database of FIG. 5.

Usage database 510 may store information received from collection devices 120. FIG. 6 is an exemplary diagram of a portion of usage database 510 according to an exemplary embodiment. It will be appreciated that usage database 510 may include multiple databases stored locally at collection center 130, or stored at one or more different and possibly remote locations.

As illustrated, usage database 510 may maintain a group of entries in the following exemplary fields: a device identification (ID) field 610, a sub-interface identification field 620, a usage amount field 630, and a timestamp field 640. Device identification field 610 may store a sequence of characters that identifies a collection device 120-1 through 120-Z from which information has been received. The sequence of characters may include, for example, a network address or another type of identifier. Sub-interface identification field 620 may store a sequence of characters that identifies the sub-interface of the collection device identified in device identification field 610 on which traffic has been received and/or transmitted. Usage amount field 630 may store a value that represents the amount of traffic that was received on and/or transmitted from the sub-interface identified in sub-interface identification field 620. In one exemplary embodiment, the value may be stored in bytes (or another unit of measure). Timestamp field 640 may store a date and/or time at which the usage amount in usage amount field 630 was received at customer usage device 410. Alternatively, timestamp field 640 may store a date and/or time (or time period) at which the usage amount in usage amount field 630 was collected at the particular collection device identified in device identification field 610. As one example, usage database 510 may store an entry from a collection device, identified as 123.456.1.1, that shows that 105123845 bytes of data was received on sub-interface A0/0.1 of the collection device. Moreover, the usage data was received at customer usage device 410 on Aug. 31, 2007, at 10:00 AM.

Although FIG. 6 shows exemplary fields of usage database 510, in other implementations, usage database 510 may contain fewer, different, or additional fields than depicted in FIG. 6.

Figure 7:
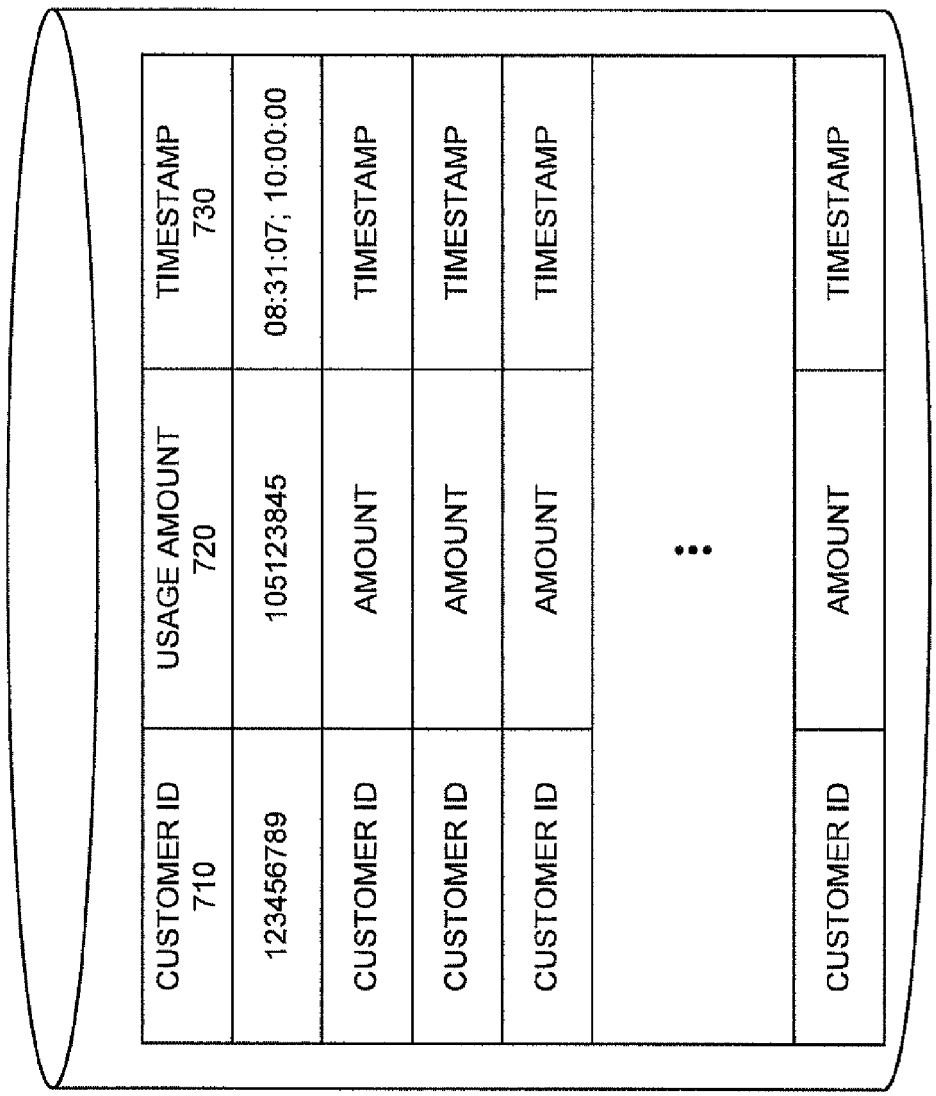
FIG. 7 is an exemplary diagram of the current customer usage database of FIG. 5.

Returning to FIG. 5, current customer usage database 520 may store information that associates the usage amounts in usage database 510 to the customers with which usage amounts are associated. FIG. 7 is an exemplary diagram of a portion of current customer usage database 520 according to an exemplary embodiment. It will be appreciated that current customer usage database 520 may include multiple databases stored locally at collection center 130, or stored at one or more different and possibly remote locations.

As illustrated, current customer usage database 520 may maintain a group of entries in the following exemplary fields: a customer identification (ID) field 710, a usage amount field 720, and a timestamp field 730. Customer identification field 710 may store a sequence of characters that identifies a customer associated with one or more customer devices 110. The sequence of characters may include, for example, a name and/or another type of identifier. Usage amount field 720 may store a value that represents the amount of traffic (e.g., in bytes or another unit of measure) that the one or more customer devices associated with the customer identified in customer identification field 710 transmitted and/or received over a time period. Timestamp field 730 may store a date and/or time at which the usage amount in usage amount field 720 was received at customer usage device 410. Alternatively, timestamp field 730 may store a date and/or time (or time period) at which the usage amount in usage amount field 720 was collected at a collection device. As one example, current customer usage database 520 may store an entry indicating that customer devices associated with a customer, identified as 123456789, transmitted and/or received 105123845 bytes of data during a time period. Moreover, the entry may indicate that the usage data was received at customer usage device 410 on Aug. 31, 2007, at 10:00 AM.

Although FIG. 7 shows exemplary fields of current customer usage database 520, in other implementations, current customer usage database 520 may contain fewer, different, or additional fields than depicted in FIG. 7. For example, customer usage database 520 may further include other information relating to the customer identified in customer identification field 710, such as an address, a telephone number, information identifying a customer type (e.g., a business customer or a residential customer), etc.

Returning to FIG. 5, controller 530 may include one or more components that control the storage of data in usage database 510 and/or current customer usage database 520. Moreover, controller 530 may also transfer entries from current customer usage database 520 to another device, such as customer usage history database 430. For example, controller 530 may receive an entry from usage database 510, may use information in the entry to obtain customer information from customer profile database 420, and store an entry in current customer usage database 520 using the entry and the obtained customer information. For example, controller 530 may receive an entry from usage database 510, may use the device identifier in device identification field 610 and the sub-interface identifier in sub-interface identification field 620 to obtain customer information (e.g., a customer identifier and/or other information) from customer profile database 420, and may store an entry in current customer usage database 520 that associates the customer information with the usage amount in the entry from usage database 510. Controller 530 may further transfer the new entry (or a portion of the new entry) in current customer usage database 520 to customer usage history database 430.

Figure 8:
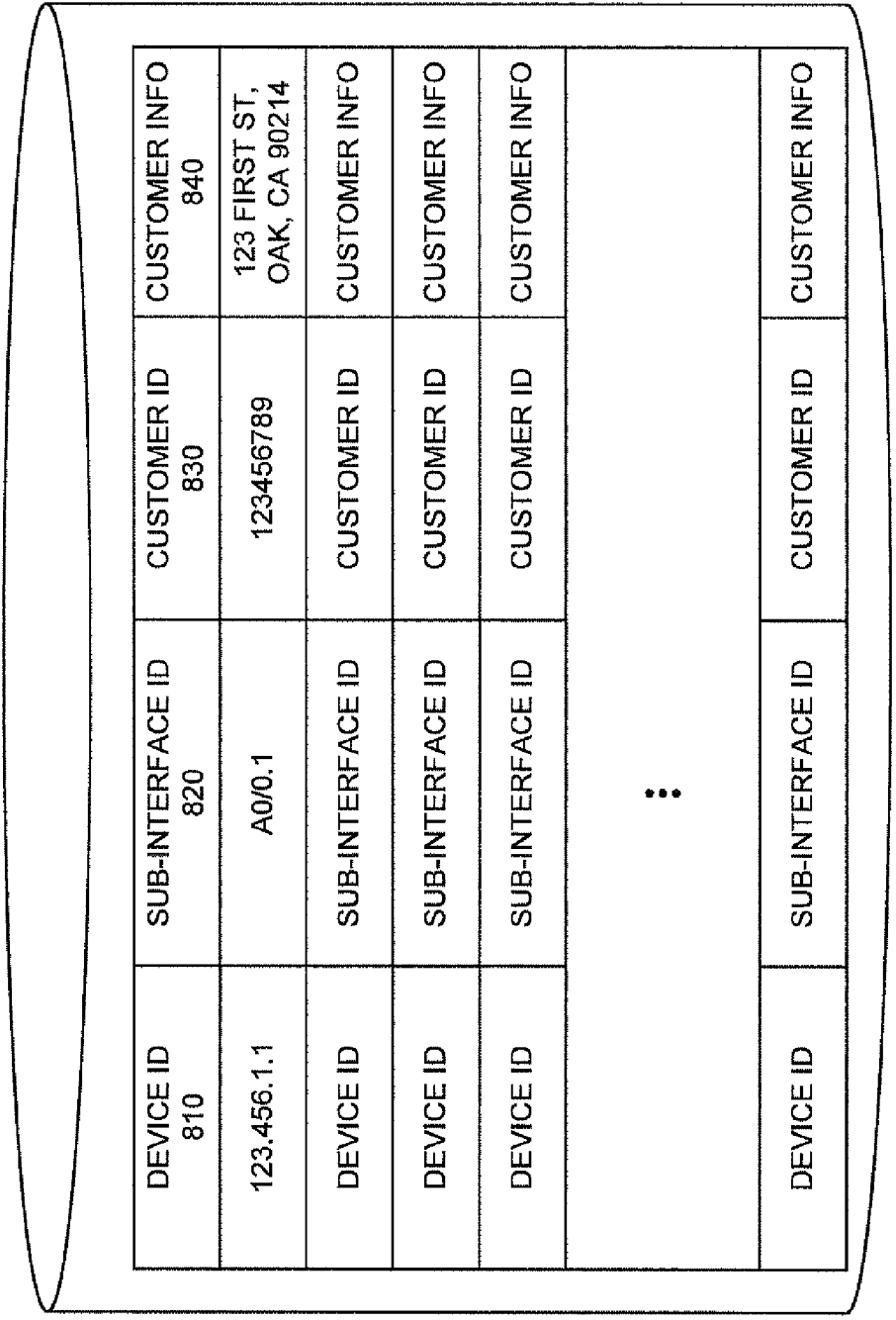
FIG. 8 is an exemplary diagram of the customer profile database of FIG. 4.

FIG. 8 is an exemplary diagram of a portion of customer profile database 420 according to an exemplary embodiment. It will be appreciated that customer profile database 420 may include multiple databases stored locally at collection center 130, or stored at one or more different and possibly remote locations.

As illustrated, customer profile database 420 may maintain a group of entries in the following exemplary fields: a device identification (ID) field 810, a sub-interface identification field 820, a customer identification field 830, and a customer information (INFO) field 840. Device identification field 810 may store a sequence of characters that identifies a collection device 120-1 through 120-Z. The sequence of characters may include, for example, a network address or another type of identifier. Sub-interface identification field 820 may store a sequence of characters that identifies the sub-interface of the collection device identified in device identification field 810. Customer identification field 830 may store a sequence of characters that identifies a customer associated with the sub-interface identified in sub-interface identification field 820. The sequence of characters may include, for example, a name, identification number, and/or other information. Customer information field 840 may store information associated with the customer identified in customer identification field 830. The information may include, for example, an address (e.g., a street, a city, a zip code, etc.), a telephone number, customer type information (e.g., business customer or residential customer), and/or other information. As one example, customer profile database 420 may store an entry that indicates that a customer, identified as 123456789, is associated with a collection device, identified as 123.456.1.1, and a sub-interface, identified as A0/0.1. Moreover, the entry may indicate that customer 123456789 may be associated with an address of 123 First Street, Oak, Calif. 90214.

Although FIG. 8 shows exemplary fields of customer profile database 420, in other implementations, customer profile database 420 may contain fewer, different, or additional fields than depicted in FIG. 8.

Figure 9:
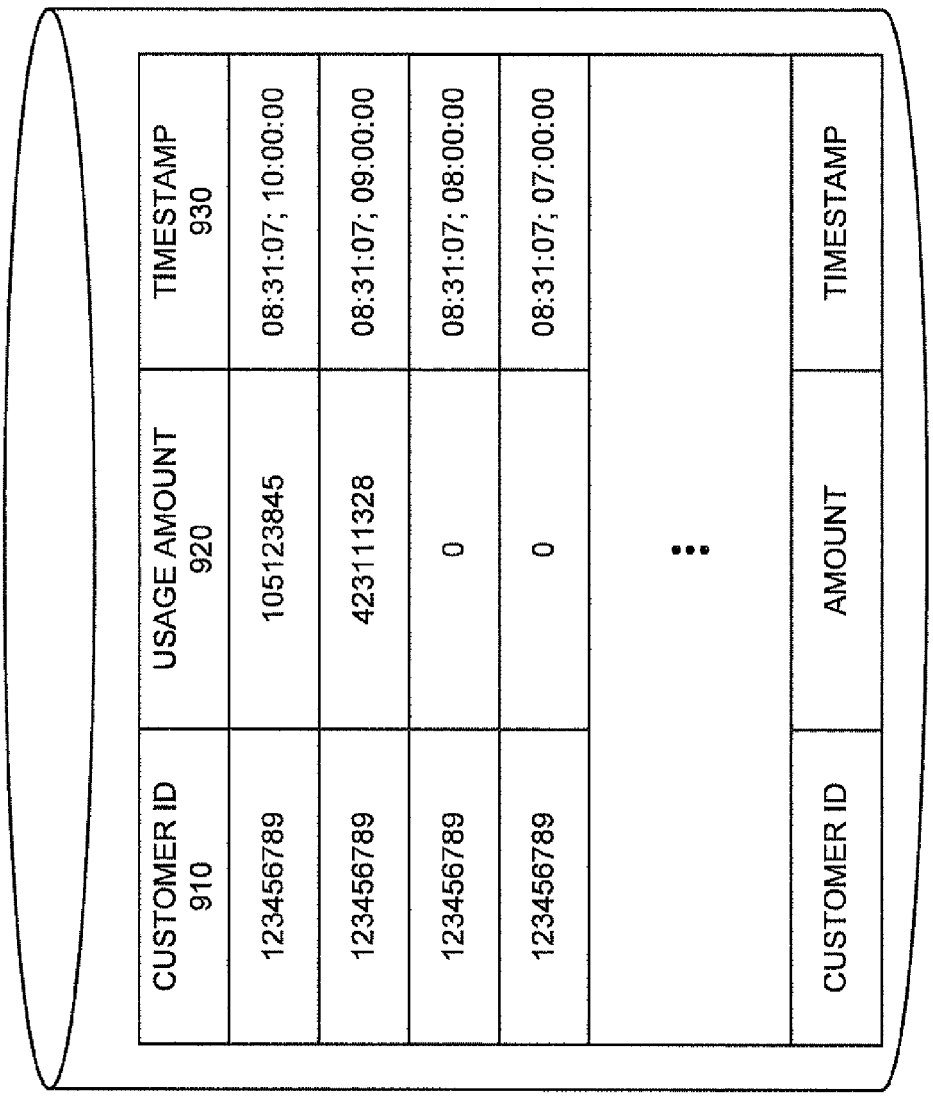
FIG. 9 is an exemplary diagram of the customer usage history database of FIG. 4.

FIG. 9 is an exemplary diagram of a portion of customer usage history database 430 according to an exemplary embodiment. It will be appreciated that customer usage history database 430 may include multiple databases stored locally at collection center 130, or stored at one or more different and possibly remote locations.

As illustrated, customer usage history database 430 may maintain a group of entries in the following exemplary fields: a customer identification (ID) field 910, a usage amount field 920, and a timestamp field 930. Customer identification field 910 may store a sequence of characters that identifies a customer associated with one or more customer devices 110. The sequence of characters may include, for example, a name, identification number, and/or other information (e.g., an address, etc.). Usage amount field 920 may store a value that represents the amount of traffic that the one or more customer devices associated with the customer identified in customer identification field 710 transmitted and/or received over a time period. Timestamp field 930 may store a date and/or time at which the usage amount in usage amount field 920 was received at customer usage device 410. Alternatively, timestamp field 930 may store a date and/or time (or time period) at which the usage amount in usage amount field 920 was collected at a collection device.

As an example, customer usage history database 430 may store a number of entries for a customer, identified as 123456789, that reflects that customer's network usage history. For example, as indicated in FIG. 9, customer 123456789 transmitted and/or received 423111328 bytes of data between 8:00 AM and 9:00 AM on Aug. 31, 2007 and 105123845 bytes of data between 9:00 AM and 10:00 AM on Aug. 31, 2007. As further shown in FIG. 9, customer 123456789 transmitted and/or received 0 bytes of data between 6:00 AM and 8:00 AM on Aug. 31, 2007.

Although FIG. 9 shows exemplary fields of customer usage history database 430, in other implementations, customer usage history database 430 may contain fewer, different, or additional fields than depicted in FIG. 9.

Figure 10:
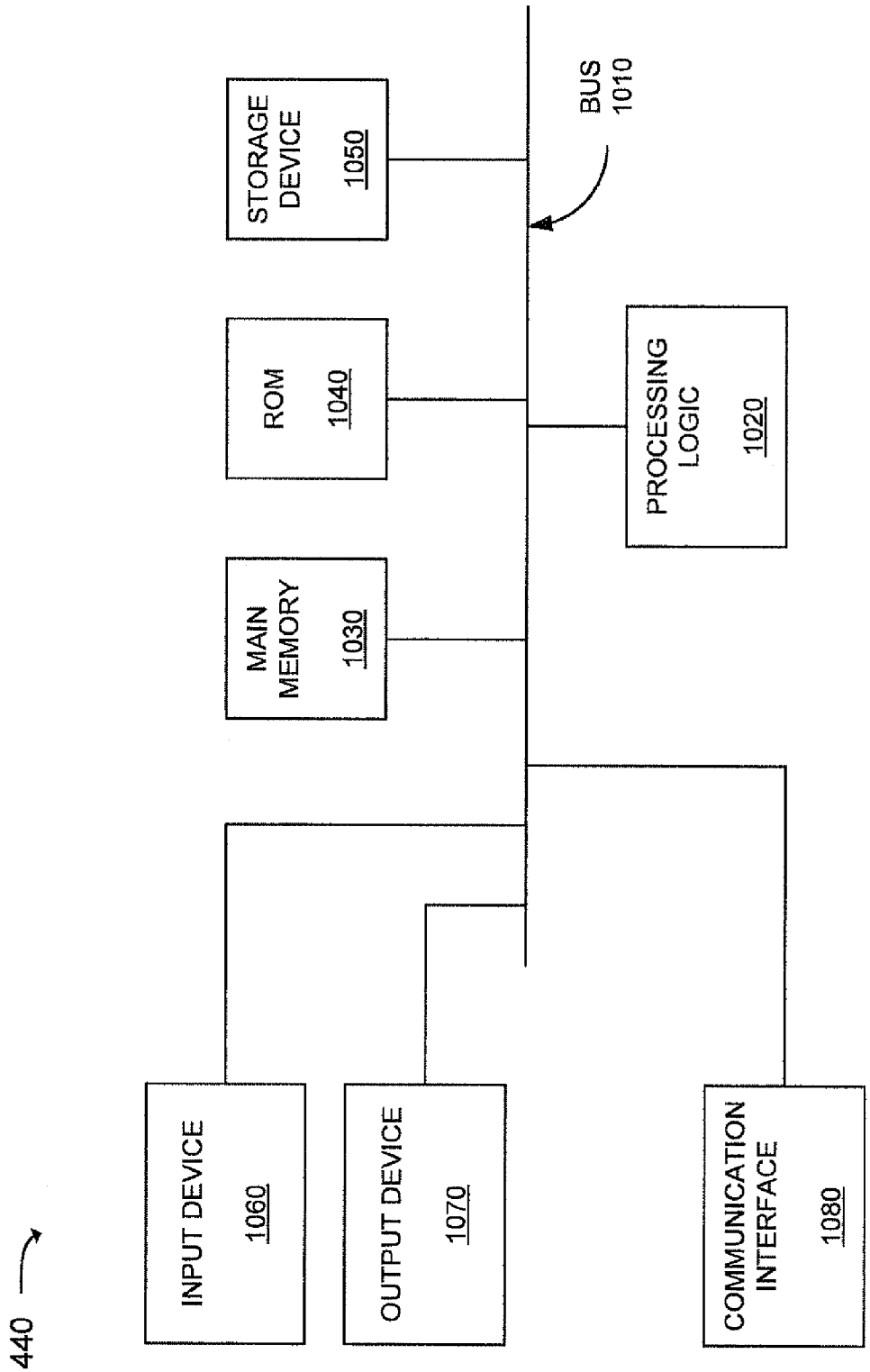
FIG. 10 is an exemplary block diagram of the report generator of FIG. 4.

FIG. 10 is an exemplary block diagram of report generator 440 according to an exemplary embodiment. As illustrated, report generator 440 may include a bus 1010, processing logic 1020, a memory 1030, a read only memory (ROM) 1040, a storage device 1050, an input device 1060, an output device 1070, and a communications interface 1080.

Bus 1010 may permit communication among the components of report generator 440. Processing logic 1020 may include any type of processor or microprocessor that interprets and executes instructions. In other implementations, processing logic 220 may be implemented as or include an ASIC, an FPGA, or the like. Memory 1030 may include a RAM or another type of dynamic storage device that stores information and instructions for execution by processing logic 1020. ROM 1040 may include a ROM device and/or another type of static storage device that stores static information and instructions for the processing logic 1020. Storage device 1050 may include some other type of magnetic or optical recording medium and its corresponding drive for storing information and/or instructions.

Input device 1060 may include a device that permits an operator to input information to report generator 440, such as a keyboard, a keypad, a mouse, a pen, a microphone, one or more biometric mechanisms, and the like. Output device 1070 may include a device that outputs information to the operator, including a display, a printer, a speaker, etc.

Communication interface 1080 may include any transceiver-like mechanism that enables report generator 440 to communicate with other devices and/or systems. For example, communication interface 1080 may include mechanisms for communicating with another device or system via a network.

Report generator 440 may perform certain operations as described in detail below. Report generator 440 may perform these and other operations in response to processing logic 1020 executing software instructions contained in a computer-readable medium, such as memory 1030. The software instructions may be read into memory 1030 from another computer-readable medium, such as data storage device 1050, or from another device via communication interface 1080. The software instructions contained in memory 1030 may cause processing logic 1020 to perform processes that will be described later. Alternatively, hardwired circuitry may be used in place of or in combination with software instructions to implement processes consistent with exemplary embodiments. Thus, systems and methods described herein are not limited to any specific combination of hardware circuitry and software.

Figure 11:
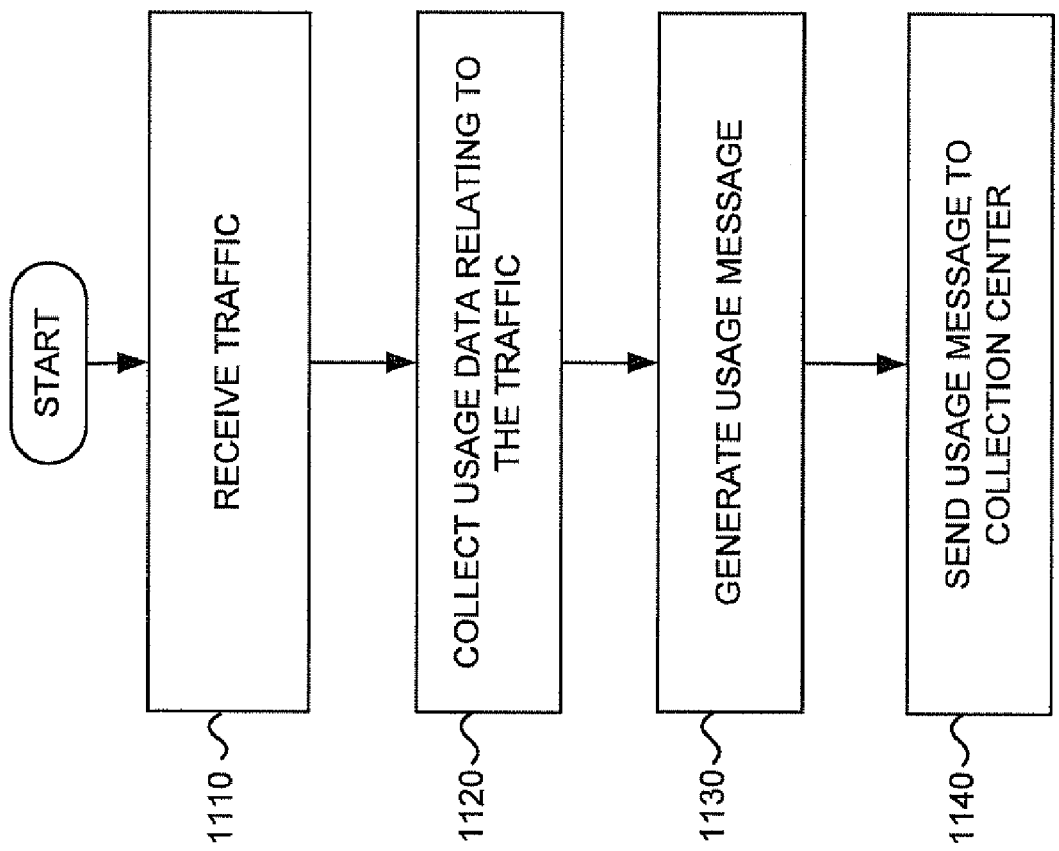
FIG. 11 is a flow chart of an exemplary process, consistent with exemplary embodiments, for providing usage data to the collection center of FIG. 2.

FIG. 11 is a flow chart of an exemplary process, consistent with exemplary embodiments, for providing usage data to collection center 130. In one embodiment, the processing of FIG. 11 may be performed by a collection device, such as collection device 120-1. In another embodiment, some or all of the processing described below may be performed by another device including or excluding collection device 120-1.

Processing may begin with collection device 120-1 receiving traffic (block 1110). In one embodiment, collection device 120-1 may receive traffic from a customer device 110-1 through 110-M and/or traffic destined to a customer device 110-1 through 110-M. Collection device 120-1 may track usage data relating to the traffic (block 1120). For example, collection device 120-1 may track a number of bytes (or other unit of measure) received on and/or transmitted from each sub-interface of collection device 120-1. In one embodiment, as described above with respect to FIG. 3, a counter may be associated with each sub-interface of collection device 120-1. The counter may track the amount of traffic that is received or transmitted on the sub-interface with which the counter is associated.

Collection device 120-1 may generate a usage message (block 1130). For example, collection device 120-1 may obtain, at a configurable interval or in response to a command, current values from the counters in counter component 320, associate the current counter values with information identifying the sub-interfaces with which the counters are associated, and generate a usage message that includes the current counter values and the associated sub-interface identification information. In one embodiment, collection device 120-1 may reset the counters in counter component 320 after the current counter values are obtained from the counters.

Collection device 120-1 may transmit the usage message to collection center 130 (block 1140). Transmission component 330 may transmit the usage message to collection center 130 in a packet or non-packet format.

Figure 12:
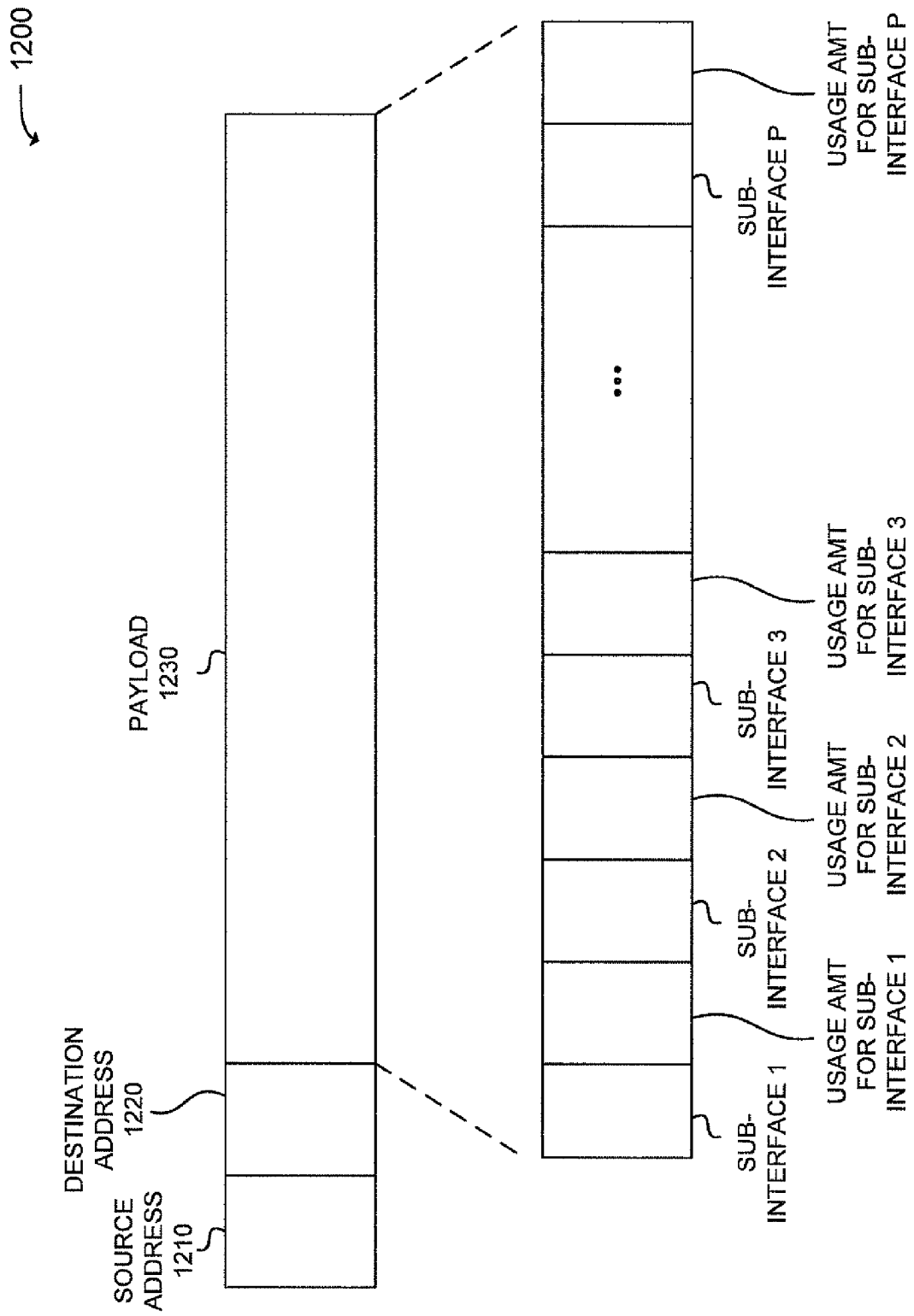
FIG. 12 is an exemplary diagram of a usage message consistent with exemplary embodiments.

FIG. 12 is an exemplary format of a usage message 1200 that may be transmitted from collection device 120-1. As illustrated, usage message 1200 may include the following exemplary fields: a source address field 1210, a destination address field 1220, and a payload field 1230.

Source address field 1210 may store an address associated with collection device 120-1 to collection center 130. The address may include, for example, an Internet Protocol (IP) address. Destination address field 1220 may store an address associated with a device in collection center 130 to which usage message 1200 is destined. In one embodiment, the address may be associated with customer usage device 410. Payload field 1230 may store data identifying sub-interfaces and the amount of data tracked for each sub-interface. For example, as illustrated in FIG. 12, payload field 1230 may include a pair of sub-fields for each sub-interface with which collection device 120-1 is associated. The pair of sub-fields may include a first field that stores information identifying the sub-interface and a second field that stores a value corresponding to the counter value obtained for that sub-interface.

Although FIG. 12 shows exemplary fields of usage message 1200, in other implementations, usage message 1200 may contain fewer, different, or additional fields than depicted in FIG. 12.

Figure 13:
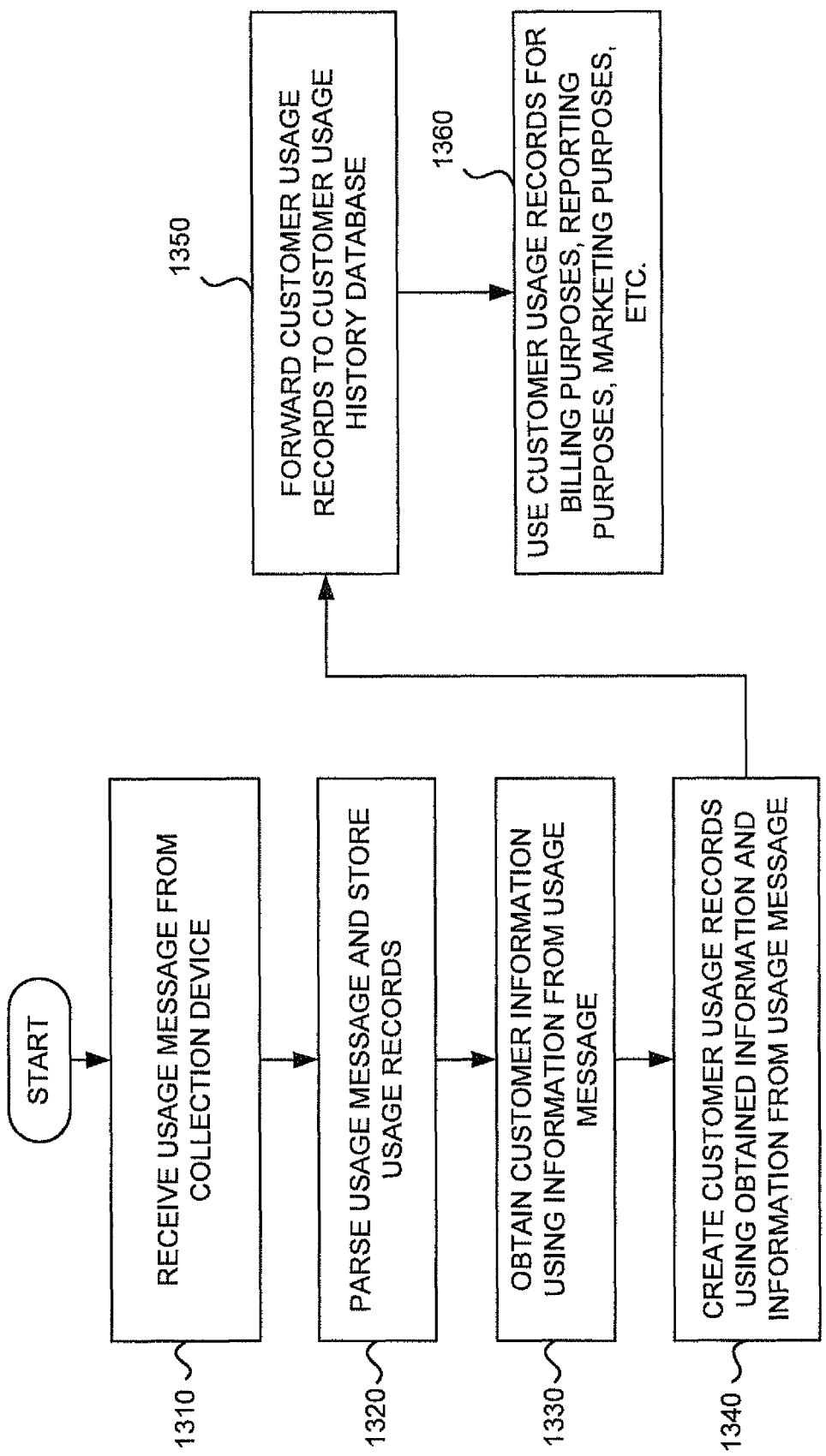
FIG. 13 is a flow chart of an exemplary process, consistent with exemplary embodiments, for processing usage messages received at the collection center of FIG. 2.

FIG. 13 is a flow chart of an exemplary process, consistent with exemplary embodiments, for processing usage messages. In one embodiment, the processing of FIG. 13 may be performed by collection center 130. In another embodiment, some or all of the processing described below may be performed by another device or group of devices including or excluding collection center 130.

Processing may begin with collection center 130 receiving a usage message, such as usage message 1200, from a collection device, such as collection device 120-1 (block 1310). In one embodiment, usage message 1200 may be received by customer usage device 410 (e.g., at usage database 510 or controller 530).

Collection center 130 may parse usage message 1200 to identify the collection device from which usage message 1200 was received and to extract the data identifying the sub-interfaces and the amount of data tracked for each sub-interface (block 1320). For example, collection center 130 may identify the collection device (i.e., collection device 120-1 in this example) using the source address in source address field 1210 in usage message 1200.

Collection center 130 may create a number of entries in usage database 510 (also called "usage records") using the collection device identification information and the extracted information (block 1320). For example, collection center 130 may create a separate entry in usage database 510, for each sub-interface identified in usage message 1200, that includes, for example, information identifying collection device 120-1, information identifying the sub-interface, information identifying the amount of data tracked at the sub-interface, and/or a timestamp.

Collection center 130 may use information from usage message 1200 to obtain customer information that is associated with the sub-interfaces of collection device 120-1 identified in usage message 1200 (block 1330). For example, controller 530 may use information identifying collection device 120-1 and each sub-interface to obtain from, for example, customer profile database 420, customer information for each sub-interface identified in usage message 1200. The customer information may include, for example, a customer identifier and/or other information relating to the customer (e.g., an address, a telephone number, etc.).

Collection center 130 may create customer usage records using the obtained customer information and information from usage message 1200 (block 1340). For example, controller 530 may store entries in current customer usage database 520. Each entry may include customer information (e.g., an identifier and/or other information), the amount of data tracked for the sub-interface(s) with which the customer is associated, and a timestamp. In this way, collection center 130 may associate customers with the amounts of traffic that the customers have uploaded and/or downloaded via customer devices 110.

Collection center 130 may forward the newly created customer usage records to customer usage history database 430 (block 1350). In this way, customer usage history database 430 may maintain historical usage records for customers. The customer usage records may be used for billing purposes (e.g., to bill a customer for the customer's network usage), for reporting purposes (e.g., to generate reports relating to a customer or a group of customers, such as a report providing usage per customer per specific time period, a report providing daily/monthly usage patterns per customer, per location, a report providing customer over-usage reports, etc.), for marketing purposes (e.g., to identify regional usage patterns per Local Access and Transport Area (LATA), per market), and/or for other purposes.

Figure 14:
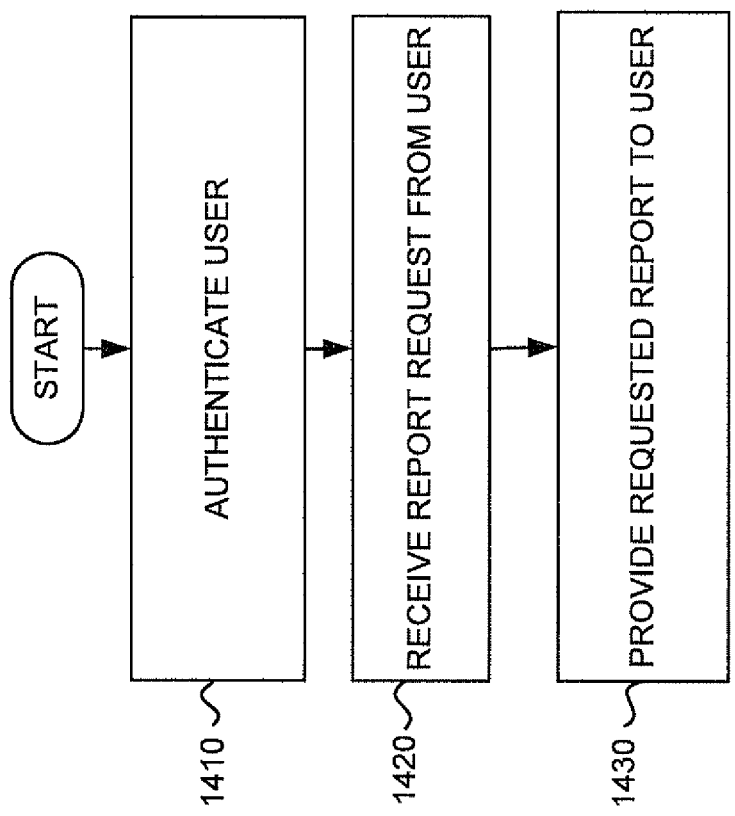
FIG. 14 is a flow chart of an exemplary process, consistent with exemplary embodiments, for providing usage reports.

FIG. 14 is a flow chart of an exemplary process, consistent with exemplary embodiments, for providing usage reports. In one embodiment, the processing of FIG. 14 may be performed by collection center 130. In another embodiment, some or all of the processing described below may be performed by another device or group of devices including or excluding collection center 130.

Processing may begin with collection center 130 authenticating a user (block 1410). In one embodiment, a user may, for example, log into report generator 440 (e.g., using a browser). In response, report generator 440 may request that the user authenticate himself/herself. The authentication may involve the user providing a user identifier and password. Once authenticated, report generator 440 may provide one or more graphical user interfaces to the user to facilitate the user's ability to specify a desired usage report.

Collection center 130 may receive a report request from the user (block 1420). For example, report generator 440 may provide the user with the ability to request a usage report for a particular time period, date, and/or date range. In some embodiments, report generator 440 may further provide the user with the ability to request a usage report for one or more geographic areas (e.g., for one or more particular zip codes, cities, states, etc.). Report generator 440 may also provide the user with the ability to specify a format in which the usage data is to be provided (e.g., a line chart, a pie chart, a bar chart, a table, and/or other types of formats). Report generator 440 may provide the user with the ability to specify other criteria for a report.

In one embodiment, the user may correspond to a customer. In this embodiment, report generator 440 may limit the data in the usage report to data associated with the customer. In another embodiment, the user may correspond to a network administrator. In this embodiment, report generator 440 may allow the user to specify that data associated with one or more customers be provided in the report, specify that data associated with a particular customer type (e.g., residential customer or business customer) be provided in the report, and/or specify that data associated with all customers be provided in the report.

Collection center 130 may create the requested report and provide the report to the user (block 1430). For example, report generator 440 may cause the report to be displayed to the user. Alternatively, report generator 440 may provide the report in another format. In one exemplary embodiment, a user may configure report generator 440 to automatically generate reports at a configurable interval. Report generator 440 may generate the reports at the appropriate interval and send the report to the user, for example, via electronic mail (e-mail) and/or via another technique.

Figure 15B:
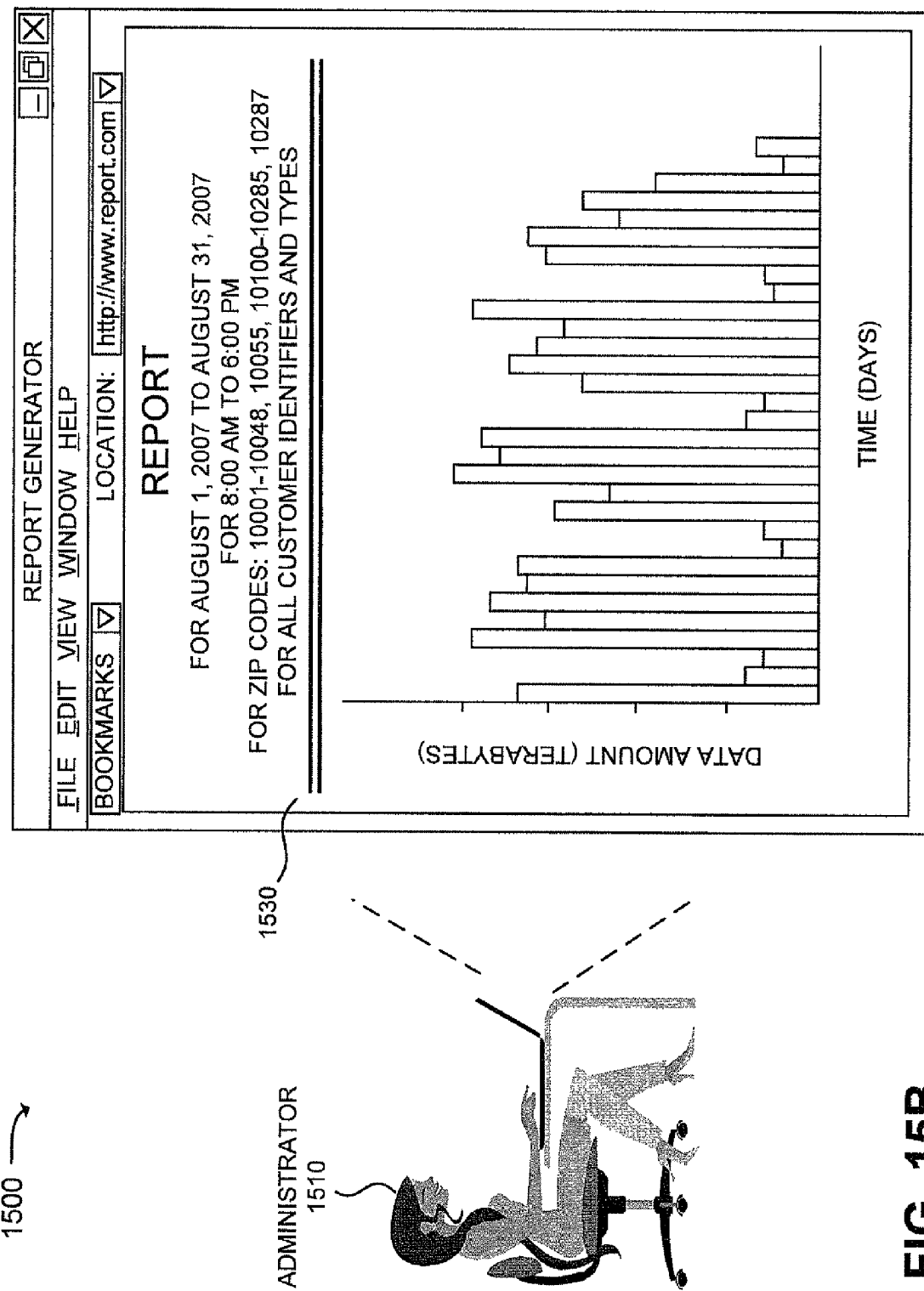
FIGS. 15A-16B illustrate examples of the processing described with respect to FIG. 14.

The following examples of FIGS. 15A-16B illustrate the processing described above with respect to FIG. 14. In a first example 1500 described with respect to FIGS. 15A-15B, assume that a network administrator 1510 desires to obtain a report regarding customers' network usage (e.g., the quantity of data uploaded and/or downloaded by customers), as illustrated in FIG. 15A. Network administrator 1510 may access report generator 440 by, for example, logging into report generator 440. Once authenticated as a network administrator, report generator 440 may provide a graphical user interface 1520 to network administrator 1510 that allows network administrator 1510 to specify criteria for the report. As illustrated in FIG. 15A, the criteria may include, for example, a date range, a time period, one or more geographic locations, customer identifiers (IDS), the type of customers to be included in the report (e.g., residential, business, or both), and an output type (e.g., the format in which network administrator 1510 desires to view the data).

In the example illustrated in FIG. 15A, network administrator 1510 has specified that the report is to include data for the date range of Aug. 1, 2007 through Aug. 31, 2007; the time period of 8:00 AM to 6:00 PM for each date in the date range; and the zip codes of 10001-10048, 10055, and 10100-10285. Network administrator 1510 has further specified that the report is to include data for all customer identifiers and all customer types (i.e., both residential and business customers). Network administrator 1510 has also specified that the report is to provide the data in a bar chart.

Assume that network administrator 1510 enters the criteria illustrated in FIG. 15A and selects the submit button. In response, report generator 440 may provide a report 1530 that includes the desired data, as illustrated in FIG. 15B. Report generator 440 may generate report 1530 using data from, for example, current customer usage database 520 and/or customer usage history database 430. Using report 1530, network administrator 1510 may determine trends for marketing (or other) purposes. Additionally, network administrator 1510 may obtain a report for one or more customers for billing purposes.

Figure 16A:
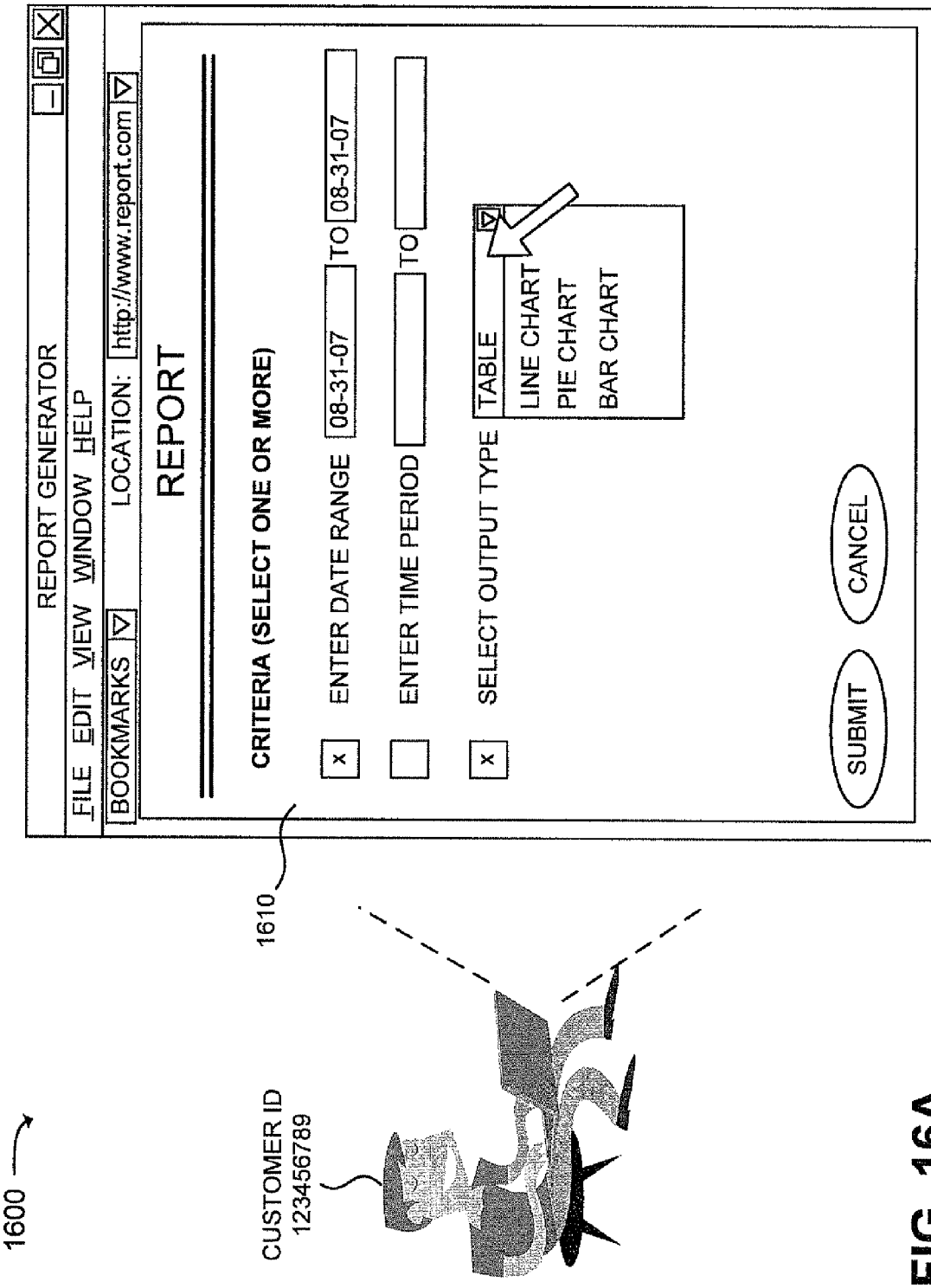
Figure 16B:
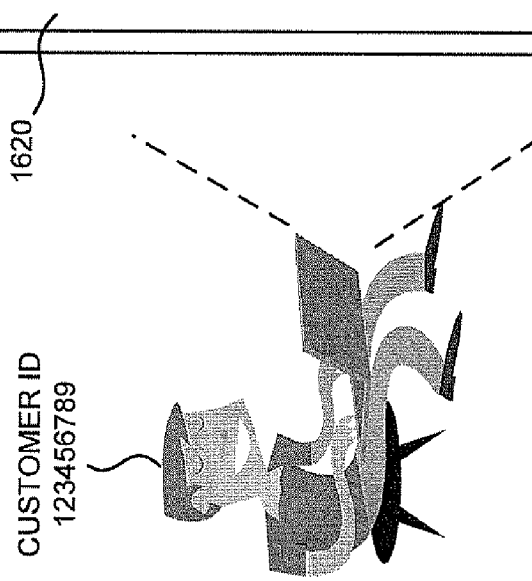

In a second example 1600 set forth in FIGS. 16A-16B, assume that a customer (with an identifier of 123456789) desires to obtain a report regarding the customer's network usage (e.g., the quantity of data uploaded and/or downloaded by the customer), as illustrated in FIG. 16A. The customer may access report generator 440 by, for example, logging into report generator 440. Once authenticated, report generator 440 may provide a graphical user interface 1610 to the customer that allows the customer to specify criteria for the report. As illustrated in FIG. 16A, the criteria may include, for example, a date range, a time period, and an output type (e.g., the format in which the customer desires to view the data).

In the example illustrated in FIG. 16A, the customer has specified that the report is to include data for Aug. 31, 2007. The customer has further specified that the data is to be provided in a table format.

Assume that the customer enters the criteria illustrated in FIG. 16A and selects the submit button. In response, report generator 440 may provide a report 1620 that includes the desired data, as illustrated in FIG. 16B. Report generator 440 may generate report 1530 using data from, for example, current customer usage database 520 and/or customer usage history database 430. Using report 1620, the customer may identify one or more time periods on Aug. 31, 2007 when data was transmitted from and/or received by the customer's customer device(s) 110. This information may allow the customer to determine the customer's amount of network usage for a given time period.

Embodiments described herein associate customer information with the customers' network usage. Reports may be provided for billing, marketing, and/or other purposes.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 11, 13, and 14, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   at least one memory to store instructions; and
   at least one processor to execute the instructions to:
      receive a message from a routing device, the message including:
         a first identifier that identifies the routing device,
         a second identifier that identifies a sub-interface associated with the routing device, and
         information identifying an amount of network traffic received at or transmitted from the sub-interface, where the sub-interface comprises at least one of a plurality of input ports of the routing device associated with a customer and at least one of a plurality of output ports of the routing device associated with the customer,
      obtain a third identifier for the customer using the first identifier and the second identifier,
      associate the third identifier for the customer with the information identifying the amount of network traffic received at or transmitted from the sub-interface to create a record, and
      store the record.

2. The system of claim 1, where the message further includes a plurality of other second identifiers and a plurality of other information identifying amounts of network traffic received at or transmitted from a plurality of other sub-interfaces, where each of the plurality of other sub-interfaces comprises at least one of the plurality of input ports associated with another customer and at least one of the plurality of output ports associated with the other customer, the other customer being different from the customer,
   where the at least one processor further:
      obtains a plurality of other third identifiers for the plurality of other customers using the first identifier and the plurality of other second identifiers,
      associates the plurality of other third identifiers with the plurality of other information identifying the amounts of network traffic received at or transmitted from the plurality of other sub-interface to create a plurality of other records, and
      stores the plurality of other records.

3. The system of claim 1, where the at least one processor further:
   generates a bill for the customer using the record.

4. The system of claim 1, where the at least one processor further:
   receives a request for a report,
   obtains the record in response to receiving the request, and
   generates the report using the obtained record.

5. The system of claim 1, where the at least one processor obtains the third identifier for the customer from a customer profile database that associates sub-interface identifiers with customer information.

6. The system of claim 1, where the processor receives subsequent messages from the routing device at a configurable interval.

7. A method comprising:
   receiving a message from a routing device, the message including:
      a first identifier, which identifies the routing device, and
      a plurality of sub-interface and data amount pairs, each sub-interface and data amount pair of the plurality of sub-interface and data amount pairs including a second identifier of a sub-interface of the routing device and information identifying an amount of data received at or transmitted from the sub-interface over a time period, where the sub-interface comprises at least one of a plurality of input ports of the routing device associated with a customer and at least one of a plurality of output ports of the routing device associated with the customer;
   obtaining, for each second identifier, a customer identifier using the second identifier from a database that associates customer identifiers with second identifiers;
   associating each obtained customer identifier with the information identifying the amount of data received at or transmitted from the sub-interface associated with the second identifier used to obtain the customer identifier;
   creating a customer record for each obtained customer identifier, the customer record including one obtained customer identifier and the associated information identifying the amount of data received at or transmitted from the sub-interface associated with the second identifier used to obtain the customer identifier; and
   storing the created customer records.

8. The method of claim 7, further comprising:
   billing the customer using at least one of the created customer records.

9. The method of claim 7, further comprising:
   generating a report using at least one of the created customer records.

10. The method of claim 7, where the creating a customer record includes:
    storing a time information in the customer record.

11. The method of claim 10, where the time information relates to the time period.

12. The method of claim 7, where the creating a customer record includes:

storing customer information in the customer record, the customer information including at least one of an address, a telephone number, or a customer type indication.

13. The method of claim 7, where each sub-interface is associated with a single customer identifier.

14. A system comprising:
a first database to associate a sub-interface identifier with customer information;
a second database to store a history of customer usage records; and
a first device to:
receive information from a routing device, the information including the sub-interface identifier for a sub-interface of the routing device and information identifying an amount of network traffic received at or transmitted from the sub-interface over a time period, where the sub-interface comprises at least one of a plurality of input ports of the routing device associated with a customer and at least one of a plurality of output ports of the routing device associated with the customer,
use the sub-interface identifier to obtain the associated customer information from the first database,
associate the customer information with the information identifying an amount of network traffic received at or transmitted from the sub-interface over a time period to create a new customer usage record, and
store the new customer usage record in the second database.

15. The system of claim 14, further comprising:
a report generator to:
receive a request for a report from a user,
obtain the new customer usage record from the second database in response to receiving the request,
generate the report using the obtained new customer usage record, and
provide the generated report.

16. The system of claim 14, where the customer information includes customer identification information and at least one of an address, a telephone number, or a customer type indication.

17. The system of claim 14, where the new customer usage record further includes time information relating to the time period.

18. The system of claim 14, further comprising:
a usage database to store the received information.

19. The system of claim 14, where the first device receives subsequent information from the routing device at a configurable interval.

20. A system comprising:
a plurality of devices, including:
a customer history database to store customer usage records for a plurality of periods of time, each customer usage record including customer information identifying a customer and information identifying an amount of data that the customer at least one of uploaded or downloaded, from a sub-interface of a routing device and to a network, over one period of time in the plurality of periods of time, where the customer history database associates the sub-interface with the customer information, where the sub-interface comprises at least one of a plurality of input ports of the routing device associated with the customer and at least one of a plurality of output ports of the routing device associated with the customer; and
a report generator to:
receive a request from a user, the request including one or more criterion,
obtain one or more customer usage records from the customer history database in response to the request,
generate a report using the obtained one or more customer usage records, and
provide the generated report to the user.

21. The system of claim 20, where each customer usage record further includes at least one of an address, a telephone number, or a customer type.

22. The system of claim 21, where one or more criterion includes information identifying more than one customer or information identifying a type of customer.

23. The system of claim 21, where the one or more criterion includes information identifying at least one geographic area.

24. The system of claim 20, where the one or more criterion includes information identifying at least one of a date, a date range, or a time period.

25. The system of claim 20, where the report provides usage per customer per specific time period; daily/monthly usage patterns per customer, per location; over-usage per customer; or regional usage patterns per Local Access and Transport Area (LATA), per market.

* * * * *